Jan. 12, 1937.  G. J. WOHANKA  2,067,253
ENGINE EXHAUST SYSTEM
Filed May 22, 1934  3 Sheets-Sheet 1
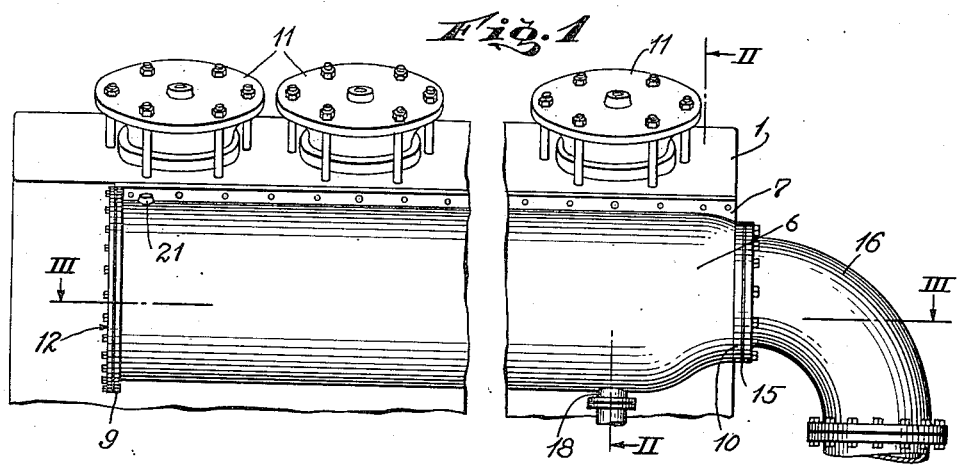
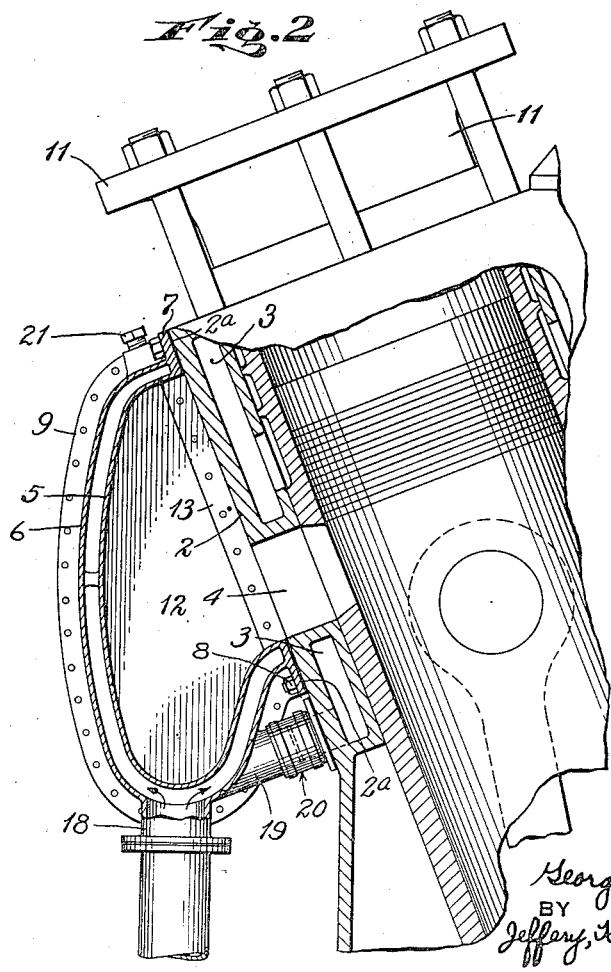

Jan. 12, 1937. G. J. WOHANKA 2,067,253
ENGINE EXHAUST SYSTEM
Filed May 22, 1934 3 Sheets-Sheet 2
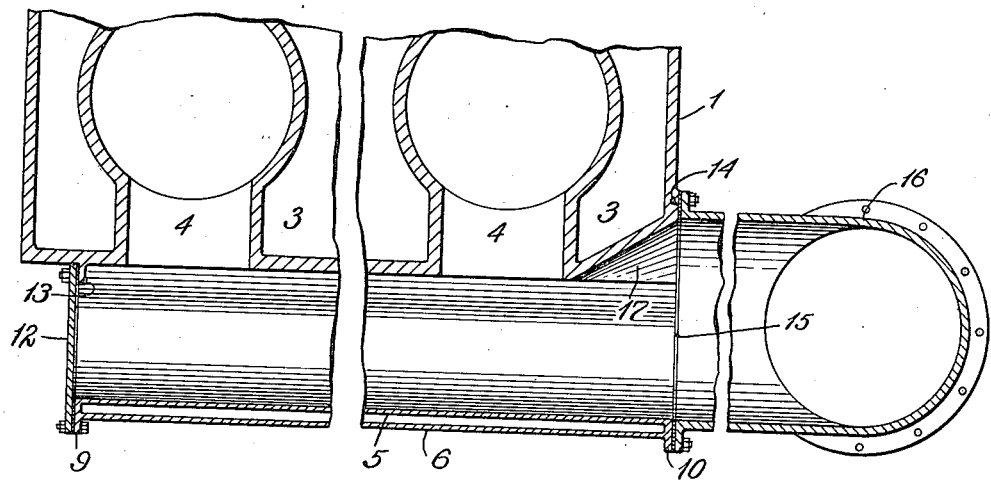
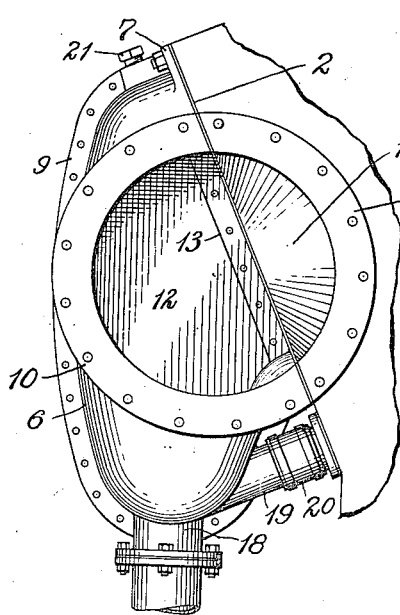
INVENTOR
George J. Wohanka
BY
Jeffery, Kimball & Eggleston
ATTORNEYS Jan. 12, 1937.  G. J. WOHANKA  2,067,253
ENGINE EXHAUST SYSTEM
Filed May 22, 1934  3 Sheets-Sheet 3
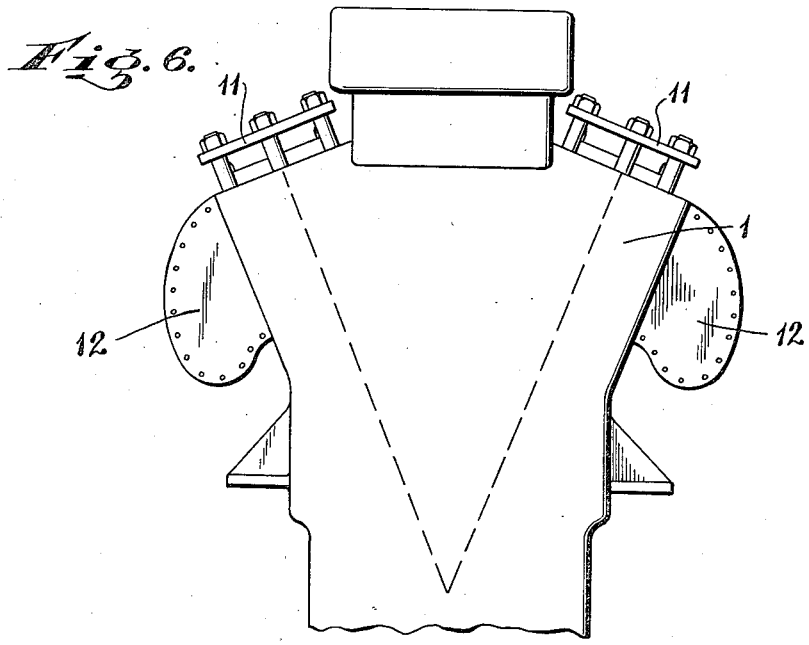
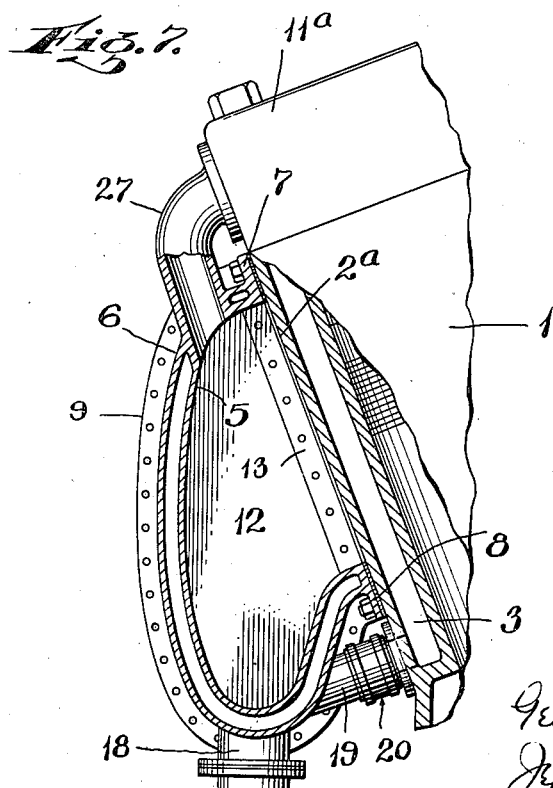

Patented Jan. 12, 1937

2,067,253

UNITED STATES PATENT OFFICE 2,067,253

ENGINE EXHAUST SYSTEM

George J. Wohanka, St. Louis, Mo., assignor to Busch-Sulzer Bros.-Diesel Engine Company, St. Louis, Mo., a corporation of Missouri Application May 22, 1934, Serial No. 726,905

6 Claims. (Cl. 60—31)

The invention is an improved organization of water-cooled exhaust system for multiple cylinder combustion engines and its object is primarily economy of weight and space in such engines and particularly with reference to V-type engines. The principles of the new construction are exemplified in the accompanying drawings, wherein Fig. 1 is a partial side view of a V-type combustion engine, which may be assumed to be of the Diesel class;

Fig. 2 is a partial vertical section thereof on line II—II of Fig. 1;

Fig. 3 a horizontal section on III—III of Fig. 1;

Fig. 4 an elevation of the header outlet; and

Fig. 5 of a modified form.

Fig. 6 represents an end elevation of the engine and

Fig. 7 the use of the invention in a four cycle engine.

In these figures the cylinder block marked 1 may be taken to be the part or whole of one side of a V-type engine, or of a straight type engine, and is constructed with any desired number of cylinder spaces and with its exterior wall on the outer or exhaust side formed and finished to a substantially flat or plane surface 2, or at least provided with appropriate seating surfaces adapting it to receive and make a tight joint with the header structure below described. Within the block is the jacket space or spaces 3 for the fluid medium used for cooling the cylinders, herein called the cooling water, and in the case of two-cycle engines, the block is formed with appropriate exhaust ports 4 leading from the cylinders and controlled by the pistons therein.

The exhaust header is represented by a hollow walled, trough-shaped structure composed of inner and outer wall members 5 and 6 spaced from each other to form a water-jacket space between them, and joined to each other along their top and bottom margins by flanges and bolts 7 and 8 and along their ends by the bolted flanges 9 and 10. This structure is attached by the flanges 7 and 8 to the flat seating or face 2 of the cylinder block with its open side against the block and over the exhaust outlets, and with asbestos gaskets 2a interposed to make tight joints. The upper joint is adjacent the top margin of the block and the lower joint is below the row of exhaust outlets. The cross-sectional contour of the header is approximately oblong with its major axis upright and it is preferably sickle-shaped, so that when thus bolted to the outside face of a V-type cylinder block, it depends below such face and its outer boundary is substantially directly below the outermost edges of the cylinder heads 11 as indicated in the sectional figures so that even with small V-angles the exhaust headers do not unduly extend the over-all width of the power plant. The passage thus produced constitutes the exhaust manifold for the cylinders, being water-cooled on one side by the water jacket of the block, which is adequate for the purpose, and on the other by the water-jacket 5—6 of the header.

The dead end of this manifold is closed in by a plate 12, bolted to the flange 9 and to a special flange 13 on the cylinder block, gaskets being interposed in each case to make the closure tight. The outlet end of the header terminates flush with the adjacent end of the block and its sickle-shaped section is here sloped or merged to an arcuate section at the flange 10 which latter registers with a concentric arcuate seat 14 prepared on the end of the block, together forming a continuously circular seat for connection through a soft gasket 15 to the circular sectioned exhaust elbow 16. The axis of the elbow flange is thus located inboard of the center of cross area of the manifold and by obliquely channelling the cylinder block where it approaches the elbow, as indicated at 17, a substantially equal cross area of flow passage is maintained up to the joint. The cross area of the manifold is conformed to the number and stroke volumes of the cylinders served and with a greater number the area is enlarged accordingly by increasing the vertical, in preference to the horizontal, dimension thereof, thereby preserving the bag effect and with V-type engines accomplishing substantial economy of over all width, as will now be apparent. The elbow, it will be understood, leads the gases downward or upward to an appropriate off-take, not shown.

Ingress and egress for the cooling water may be made by any appropriate connections to the header, as by the pipe flange 18 and the connection nipples 19 at the bottom of the header. These nipples connect to the block jacket by short sections of rubber hose 20 or like flexible connecting means, the use of which facilitates the assembly of the manifold on the block. An air vent 21 is also provided on the upper side of the manifold jacket space.

Fig. 5 illustrates that the construction above described can be executed also in sheet metal. The two sheet metal wall members 22 and 23 are separated and braced by welded spacer bonds 24 and at their margins are welded to angle bars 25 and 26 which serve as the bolt flanges, the pipe flange 18 and connector nipples 19 being also welded in place as will be understood and the construction otherwise being the same as above described and with the same essential advantages. The new construction can also be employed with four-cycle engines in which case the exhaust from the respective cylinder heads 11a is brought from each of them through an elbow connection shown at 27 in Fig. 7, directly into the top part of the header.

I claim:—

1. In a V-type engine having mutually inclined cylinder blocks including rows of cylinders and providing common water-jackets therefor, the combination with one of said cylinder blocks of a double-walled, water-containing, trough-shaped exhaust header bolted with its open side against the inclined outer face of said block, the passage within said header being thereby cooled by water on both sides and being higher than wide and wider at bottom than at top and an offtake connected to the header.

2. In a multi-cylinder V-type, combustion engine, the combination with a water-jacketed cylinder block containing a row of engine cylinders, of a water-jacketed, channel-shaped exhaust header, bolted with its open side against the side wall of said block and in communication with the engine cylinders and forming an exhaust manifold therefor, and an exhaust outlet elbow attached jointly to the end of said header and to said block.

3. In a multi-cylinder combustion engine, the combination with a water-containing cylinder block, a channel-shaped header secured with its open side against the exhaust side of said block and forming an exhaust manifold therewith, and an exhaust outlet elbow of circular section attached jointly to the end of said header and the end of the block, the axis of said elbow being inboard of the center of cross area of said header, and the block adjacent the elbow being channelled to accommodate the gas flow at the junction of manifold and elbow.

4. In a two-cycle V-type combustion engine having mutually inclined cylinder blocks each including a row of cylinders with a common water-jacket therefor and having piston-controlled exhaust ports extending through the water-cooled faces of the blocks on the outer sides of the V, the combination with one of said blocks of a double-walled, water-containing, trough-form exhaust header having a cross section which is higher than wide, bolted with its open side against said face, over and above said ports, whereby the block water-jacket coacts with the water in the header in cooling the exhaust gas flow in said header and an offtake for said header.

5. The combination with the water-jacketed cylinder block of a two-cycle V-type engine containing a row of cylinders and having piston-controlled exhaust ports for the cylinders passing through the outer wall of the block, of a double-walled, water-containing, trough-shaped header bolted to the side of said block over and above said exhaust ports and forming with said block a water-jacketed exhaust passage common to said ports, the passage within said manifold being water-cooled on one side by its own contained water and on the opposite side by the water in the block and being wider at the bottom than at the top and extending vertically below said exhaust ports, and an exhaust offtake connected to the header.

6. In a two-cycle engine having a water-jacketed cylinder block with exhaust ports therein uncovered by the piston at the end of its stroke, the combination of means for cooling the exhaust gas issuing therefrom comprising a trough-shaped, double-walled, water-containing exhaust header bolted with its open side covering said exhaust ports and some of the water-jacketed block surface adjacent thereto whereby the block jacket-water cooperates with the water in the header in cooling the exhaust gas, and an offtake connected to the header.

GEORGE J. WOHANKA.